United States Patent [19]

Sakamoto

[11] 4,254,367
[45] Mar. 3, 1981

[54] DIGITAL SERVO CIRCUIT
[75] Inventor: Hitoshi Sakamoto, Zama, Japan
[73] Assignee: Sony Corporation, Tokyo, Japan
[21] Appl. No.: 2,808
[22] Filed: Jan. 11, 1979
[30] Foreign Application Priority Data Jan. 17, 1978 [JP] Japan .................................. 53-2708
Jan. 17, 1978 [JP] Japan .................................. 53-2709

[51] Int. Cl.³ .............................................. H02P 5/16
[52] U.S. Cl. .................................... 318/314; 318/318; 318/341; 318/608
[58] Field of Search ................ 318/314, 318, 341, 608
[56] References Cited
U.S. PATENT DOCUMENTS 3,836,756  9/1974  Yammoto et al. ................... 318/608

Primary Examiner—David Smith, Jr.
Attorney, Agent, or Firm—Lewis H. Eslinger; Alvin Sinderbrand

[57] ABSTRACT

A digital servo circuit which, for example, may be used in a video tape recorder, for controlling the velocity and the phase of movement of a video tape by a capstan which is driven by an electric motor. The circuit includes a frequency generator for generating a pulse signal having a repetition rate that varies in accordance with the velocity of the capstan, and hence of the tape driven thereby an n-bit presettable counter for counting a reference clock signal during an interval corresponding to the repetition rate of the pulse signal, a latch circuit for latching the least significant m output bits of the counter (where m is less than n), a control circuit for controlling the m-bit output from the latch circuit so as substantially to hold the latter output at the minimum level when the n-bit output from the counter is less than a first predetermined value, and at the maximum level when the n-bit output from the counter is more than a second predetermined value, and a digital-to-analog converter for converting the m-bit output from the latch circuit to the corresponding analog signal to drive the motor.

7 Claims, 5 Drawing Figures

DIGITAL SERVO CIRCUIT

BACKGROUND OF THE INVENTION

1. Field of the Invention

This invention relates to a digital servo circuit, and more particularly to such a circuit for digitally controlling rotation of a rotating member with high stability over a wide range.

2. Description of the Prior Art

A servo circuit for an electric motor used in a video tape recorder (VTR) or in similar apparatus must be highly precise, because such apparatus needs high time base stability for a video signal to be properly processed. For reasons of accuracy, cost and stability it is desirable that the servo circuit be formed as a digital circuit.

When adapting a servo circuit for a VTR or like apparatus to digital form, it is convenient for the circuit to be basically similar to a conventional servo circuit of analog form.

FIG. 1 of the accompanying drawings shows one example of a conventional digital servo circuit, which includes a digital rotational speed detector 10 and a digital phase detector 12 which are provided with respective associated digital-to-analog (D/A) converters 11 and 13. A frequency generator (FG) 16 generates a signal representing the rotational frequency of an electric motor 14 which is to be controlled by the servo circuit. The signal from the FG 16 is supplied to the velocity detector 10, and a digital velocity signal developed thereby is converted in the D/A converter 11 into an analog signal x, which is supplied to a circuit point 18.

In addition, a pulse generator (PG) 20 develops a digital signal representing the rotational position or phase of the motor 14. The signal from the PG 20 is compared in the digital phase detector 12 with a reference pulse signal supplied by way of a terminal 22. An error signal produced by the phase detector 12 is converted in the D/A converter 13 into an analog signal y, from which is subtracted the signal x at the circuit point 18. The difference signal resulting at the circuit point 18 is supplied to the motor 14 through a motor drive circuit 24 to control rotation of the motor 14.

The digital servo circuit of FIG. 1, in which the necessary subtraction of signals is performed in the form of analog voltages or current signals, has the advantage that this subtraction is easy to perform, and moreover the necessary circuit constants of the servo circuit can easily be determined. On the other hand, the D/A converters 11 and 13 associated with the digital elements, and in particular the D/A converter 13 associated with the phase detector 12 must have a wide detecting range or dynamic range in order to obtain a satisfactory response speed of the servo circuit.

When the maximum operational range of the D/A converter 13 is wider than that of the D/A converter 11, there is the possibility of the servo circuit behaving abnormally in transient conditions. For example, an excessive error signal can cause the system to go into transient oscillation, or run into a condition beyond the range of lock-in. Therefore, the D/A converter 11 in the servo circuit of FIG. 1 needs a wide dynamic range or resolution for stable operation.

FIG. 2 shows another conventional digital servo circuit, which has a digital adder 26, in which the digital output signals from the detectors 10 and 12 are added together. In the servo circuit of FIG. 2, the adder 26 is provided instead of the D/A converters 11 and 13 associated respectively with the detectors 10 and 12 of the servo circuit of FIG. 1. In this case the digital output of the velocity detector 10 is subtracted from the digital output of the phase detector 12. The output of the adder 26 is converted by a D/A converter 28 into an analog signal, which is supplied to the motor 14 through the motor drive circuit 24.

The servo circuit of FIG. 2 has a similar problem to that of the servo circuit of FIG. 1, that is, in order to prevent the system from behaving abnormally in transient conditions it is necessary for the system to satisfy the condition that m is greater than or equal to n, where the numbers of bits of the outputs of the velocity detector 10 and the phase detector 12 are respectively represented by m and n. Accordingly, when a higher transient lock-in speed is required, it is necessary not only to increase the number of bits n, but also to increase the number of bits m. This adds complication, because of the resultant need to scale up the processing ability of the velocity detector 10 and the adder 26.

SUMMARY OF THE INVENTION

Accordingly, it is an object of this invention is to provide a digital servo circuit which overcomes the above described disadvantages of the prior art.

More particularly, it is an object of this invention is to provide a digital servo circuit capable of controlling speeds over a wide range without requiring digital to analog converters having a correspondingly wide range.

Another object of the present invention is to provide a digital servo circuit suitable for controlling the capstan drive of a VTR.

In accordance with an aspect of the present invention, a digital servo circuit for controlling the velocity and the phase of a moving member which is driven by an electric motor includes means for generating a reference clock signal, means for generating a pulse signal having a repetition rate that varies in accordance with the velocity of the moving member, n-bit presettable counter means for counting a reference clock signal during an interval corresponding to the repetition rate of the pulse signal, latch means for latching the least significant m-bit output of the counter means (where m is less than n), control means for controlling the m-bit output from the latch means so as substantially to hold the latter output at a minimum level when the n-bits count of the counter means is less than a first predetermined value, and at a maximum level when the n-bit count of the counter means is more than a second predetermined value, and means for converting the m-bit output from the latch means to the corresponding analog signal with which to control the rotation of the motor.

It is a further feature of the invention that the servo circuit also includes means for providing a reference phase signal, means for generating a second pulse signal that represents the instantaneous position of said moving member, k-bit counter means for counting the reference clock signal during an interval which corresponds to the phase difference between the second pulse signal and the reference pulse signal, and means for loading the k-bit output of the second counter means into the least significant k bit positions of the first counter means at an interval corresponding to the repetition rate of the first pulse signal. In such a servo circuit the number k can be less than n and greater than m;

The above, and other objects, features and advantages of this invention will be apparent from the following detailed description of illustrative embodiments of the invention which is to be read in connection with the accompanying drawings.

DESCRIPTION OF THE PREFERRED EMBODIMENTS

Figure 1:
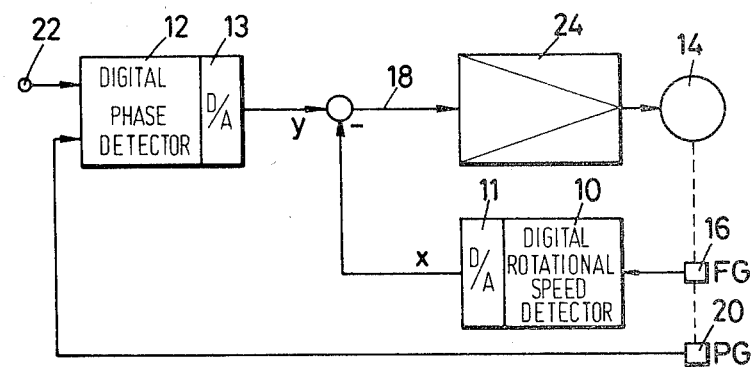
FIGS. 1 and 2 are block diagrams showing prior art servo circuits, that have already been explained.

Preferred embodiments of the present invention will now be described with reference to the drawings, wherein the same reference numerals identify corresponding elements.

Figure 3:
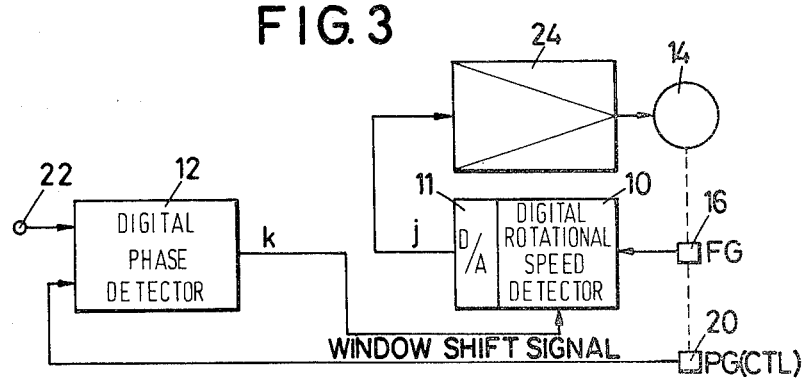
FIG. 3 is a block diagram of a basic embodiment of a servo circuit according to the invention.

FIG. 3 shows a block diagram of a basic servo circuit according to the invention. The rotation of an object, such as the motor 14 to be controlled by the servo circuit, is detected by the frequency generator (FG) 16 and the pulse generator (PG) 16 and 20. In a video tape recorder (VTR), in place of the PG 20 may be provided means to derive a control time (CTL) signal from the magnetic tape. The output of the FG 16 is in the form of a pulse signal having a repetition rate that varies in accordance with the velocity of the motor 14. This output is supplied to the velocity or rotational speed detector 10, which produces a digital signal corresponding to the output of the FG 16. The digital signal of the velocity detector 10 is converted by the D/A converter 11 into a corresponding analog signal J, which is supplied to the motor 14 through the motor drive circuit 24. The output of the PG 20 is compared in the phase detector 12 with a reference pulse signal supplied by way of the terminal 22. The phase detector 12 produces a digital signal K corresponding to a phase error. The digital signal K is supplied to the velocity detector 10 as a "window shift signal", which will be explained hereinafter in detail.

The velocity detector 10 has a presettable counter which counts the number of reference clock pulses during the intervals of the pulses supplied from the FG 16. The digital signal K is supplied to this counter as a load input. The counter is controlled so as to produce an output corresponding to a minimum level when the total count in the counter is less than a first predetermined value, to produce another output corresponding to a maximum level when the total count in the counter is more than a second predetermined value, and to produce a linearly changing digital output when the total count in the counter is within the range between the first and the second predetermined values. Therefore, when the digital signal K supplied to the load input of the counter changes, the window, or the linearly changing region of the output of the counter, is shifted in the upward or downward direction in accordance with the digital signal K. This means that the phase error is added to the signal for controlling the motor 14.

Figure 2:
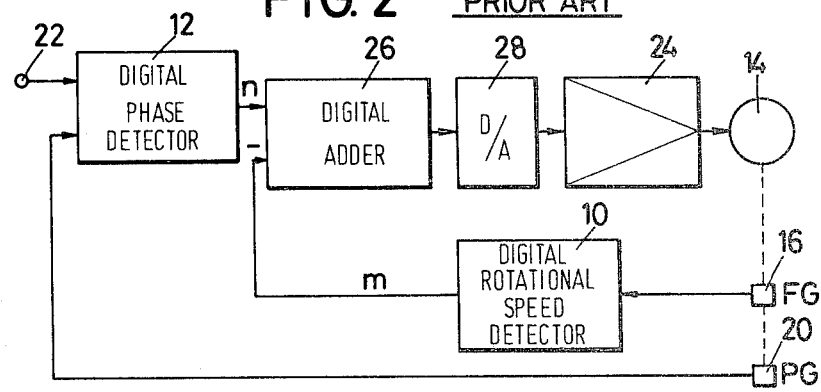

The maximum operational range of the phase detector 12, that is, the number of bits of the digital signal K can be made larger than that of the number of bits of the difference between the maximum and minimum level of the digital output of the velocity detector 10 without encountering the problems of the prior art, because the number of bits of the signal K is small relative to the total count capacity of detector 10. For example, when alternately large and small values for the output signal K are produced by the phase detector 12 transiently during initial run up of the motor 14 to operational speed, the window, or the linear operation region, of the velocity detector 10 is shifted in the downward or upward direction, respectively. But a digital output corresponding to the maximum level of velocity detector 10 is continuously supplied to the D/A converter 11, and results in rapid acceleration of the motor, because during initial run up the total count in velocity detector 10 will exceed the second predetermined value no matter how large or how small is the value of the output signal K. When the rotational speed of the motor has increased sufficiently, the rotational speed of the motor 14 comes into the linear operation region of the velocity detector 10. Thus, under the control of the speed servo loop, the rotational phase of the motor approaches a predetermined condition in dependence on the digital signal K. Therefore, with this embodiment, the unstable and undesirable operation which is likely to occur in the servo circuits of FIGS. 1 and 2 will be prevented, even when a large error in rotational speed or phase occurs, as during a transition time.

Figure 4:
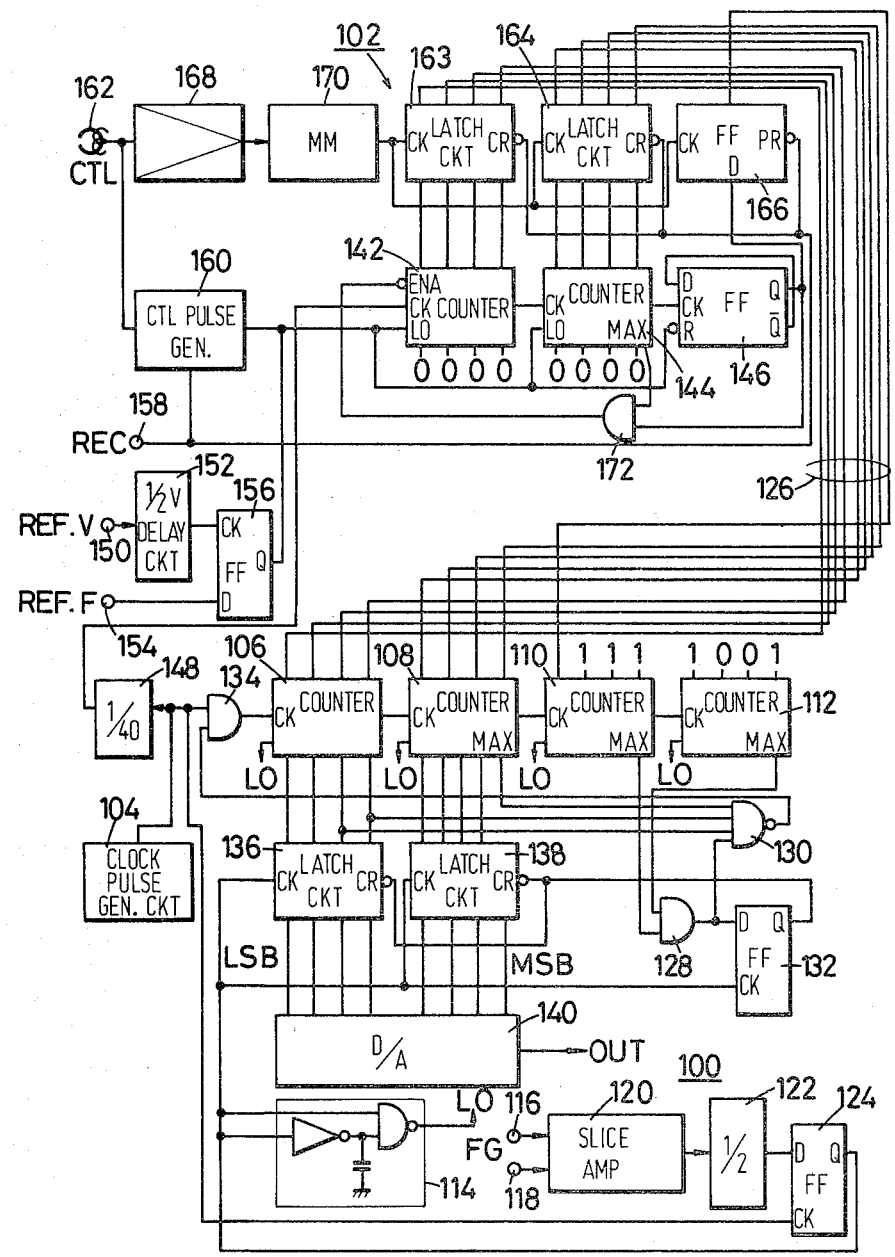
FIG. 4 is a circuit diagram of an embodiment of the invention forming a capstan servo circuit of a VTR.

Referring to FIG. 4, this shows the basic embodiment of FIG. 3 adapted to a capstan servo circuit of a VTR.

An important purpose of the capstan servo circuit is to obtain stable transport of the magnetic tape and thereby a stably reproduced picture by causing recording tracks to be read in proper synchronization with the control signal (CTL signal) recorded on the magnetic tape. Further, it is necessary for the servo circuit to control the tape speed closely during normal transport of the magnetic tape, and to operate within a wide dynamic range for achieving the correct framing with a rapid lock-in characteristic.

The capstan servo circuit of FIG. 4 comprises a speed control circuit 100, a phase control circuit 102 and a clock pulse generating circuit 104.

The speed control circuit 100 includes four preset-type 4-bit counters 106, 108, 110 and 112 which are cascaded in series in that order to form a 16-bit presettable counter. Each of the counters 106, 108, 110 and 112 has a load input terminal LO to which load pulses are supplied from a load pulse generating circuit 114, and a clock input terminal CK. Clock pulses are supplied from the clock pulse generating circuit 104 to the clock input terminal of counter 106, and the overflow output of counter 106, 108 and 110 are fed to the clock input terminals of counters 108, 110 and 112 respectively. The clock pulse generating circuit 104 may comprise a crystal-controlled oscillator having an oscillational frequency of 14.31818 MHz, which is four times the frequency of the colour sub-carrier of the NTSC television system. The output of the oscillator is synchronised with an FG signal, as described below. A frequency generator FG having, for example, one hundred and five teeth is provided on the rotational shaft of the capstan motor (not shown). The output of the frequency generator FG is supplied through terminals 116 and 118 to a differential slice amplifier 120, in which the output signal of the frequency generator FG (FG signal) is converted to zero-crossing pulses. The frequency of the zero-crossing pulses is divided by two by a frequency divider 122, the output (½ FG signal) of which is supplied to a data input terminal D of a D-type flip-flop 124. The clock pulses from the oscillator 104 are also supplied to a clock terminal CK of the flip-flop 124. Thus, a signal synchronised with the clock pulses and having a frequency one half of that of the FG signal is obtained at an output terminal Q of the flip-flop 124. The synchronised signal is supplied to the load pulse generating circuit 114 which generates the load pulses shortly after the leading edges of the synchronised signal.

The counters 106, 108, 110 and 112 have a total counting capacity of 16-bits. The counters 106, 108, 110 and 112 are preset by data supplied from the phase control circuit 102 through lines 126 at every load pulse supplied to the load input LO. Moreover, the counters 106, 108, 110 and 112 count the clock pulses supplied from the clock pulse generating circuit 104. The second, third and fourth counters 108, 110 and 112 have respective maximum output terminals MAX which become "1" when the count in each respective counter 108, 110 and 112 is the maximum value, that is "1111". The outputs from the terminals MAX of the third and fourth counters 110 and 112 are supplied to an AND gate 128, the output of which is supplied to one input terminal of a NAND gate 130 and a data input terminal D of a D-type flip-flop 132. The output from the terminal MAX of the counter 108 and the outputs of the most significant two bits of the first counter 106 are respectively supplied to the other input terminals of the NAND gate 130. The output of the NAND gate 130 is supplied to one input terminal of an AND gate 134. The clock pulse signal from the clock pulse generating circuit 104 is supplied to the other input terminal of the AND gate 134, the output of which is supplied as a clock input to the counters 106, 108, 110 and 112. The 16-bit presettable counter formed by D-type flip-flop 132 receives the ½ FG signal from the flip-flop 124 at the clock input terminal CK thereof.

The speed control circuit 100 further includes first and second 4-bit latch circuits 136 and 138. These latch circuits 136 and 138 receive the least significant 8-bits of the counters 106, 108, 110 and 112. The 8-bit output of the latch circuits 136 and 138 are supplied to a D/A converter 140, the output of which is supplied to the capstan motor through the motor drive circuit. The latch circuits 136 and 138 each receive the ½ FG signal from the flip-flop 124 at the clock input terminals CK thereof. The output of the output terminal Q of the flip-flop 132 is supplied to clear terminals CR of the latch circuits 136 and 138.

The AND gate 128, NAND gate 130, D-type flip-flop 132 and AND gate 134 are provided as a control circuit for controlling the 8-bit output from latch circuits 136 and 138 so as substantially to hold such output at a minimum level when the 16-bit count of counters 106, 108, 110, and 112 is less than a first predetermined value and at a maximum level when said 16-bit count is greater than a second predetermined value. AND gate 128 and flip-flop 132 operate as a first detecting circuit which fixes the outputs of the latch circuits 136 and 138 at a minimum value for a count smaller than a count state in which all of the 8 most significant bits of the counters 106, 108, 110 and 112 are "1". AND gate 128, and NAND gate 130, operate as a second detection circuit which fixes the outputs of the latch circuits 136 and 138 at a maximum value for a count larger than a count state in which all of the 14 most significant bits of the counters 106, 108, 110 and 112 are "1". The minimum count state is achieved by supplying the output of the terminal Q of the flip-flop 132 to each of the clear input terminals CR of the latch circuits 136 and 138. These latch circuit remain clear unless a "1" input is supplied to their clear input terminals. The maximum count state is achieved by supplying the output of the NAND gate 130 to the input of the AND gate 134.

The latch circuits 136 and 138 are triggered by the leading edge of the synchronised signal from the flip-flop 124 to latch the least significant 8 bits of the counters 106, 108, 110 and 112. Since the latching of the outputs of the counters 106, 108, 110 and 112 occurs in synchronism with the clock pulse signal, there is no possibility of transmitting the outputs of the counters 106, 108, 110 and 112 in a transitional condition during which their count state is changing.

The load pulse is produced by the load pulse generating circuit 114 immediately after the latch pulse (½ FG signal). The counters 106, 108, 110 and 112 are preset to an initial state in response to the load pulse, and their 9 least significant bits are supplied with data from lines 126, the centre value of which is "1 0000 0000". The most significant 7 bits of the load inputs of the 16-bit counter circuit are fixed as "1001 111" in this embodiment. Therefore, the counters 106, 108, 110 and 112 are set into the initial state "1001 1110 0000 0000+data." The central preset value of the initial state is set to the binary number "1001 1111 0000 0000," which represents the decimal number 40704.

As the outputs of the terminals MAX of the third and fourth counters 110 and 112 are supplied to the AND gate 128, the output of the AND gate 128 becomes "1" when the outputs of the counters 106, 108, 110 and 112 are "1111 1111 xxxx xxxx", where "x" represent either "1" or "0". The output "1" of the AND gate 128 is supplied to the clear terminals CR of the latch circuits 136 and 138 through the flip-flop 132 for synchronising the output of the AND gate 128 with the ½ FG signal. As a result, the output "1" of the AND gate 128 releases the clear condition of the latch circuits 136 and 138. Thus, the outputs of the latch circuits 136 and 138 can have a value other than "0" only when the outputs of the counters 106, 108, 110 and 112 are "1111 1111 xxxx xxxx". This means that the operational range (the window) of the D/A converter 140 in the speed servo loop is set in the region where the 8 most significant bits of the counters 106, 108, 110, and 112 are all "1".

The high level output of the AND gate 128 is supplied to the NAND gate 130, to which the output of the terminal MAX of the second counter 108 and the outputs at the third and fourth digits of the first counter 106 are also supplied. Therefore, an inhibit signal "0" is produced at the output of the NAND gate 130 when the outputs of the counters 106, 108, 110 and 112 reach the shut-off count state of "1111 1111 1111 1100". The inhibit signal "0" is supplied to the AND gate 130 to inhibit the AND gate 130. This prevents the counters 106, 108, 110 and 112 from overflowing upon low speeds of the capstan motor such as occur during start up. This inhibit signal is generated before the count state of "1111 1111 1111 1111", to prevent the 16-bit counter from recycling if one or two clock pulses are counted during the delay from the time of detecting the shut-off count state until the inhibition of AND gate 130. This is important since the pulse period of the clock pulse, for example 70 nsec, may be too short for the cumulative response time of the low power Schottky TTL circuits generally employed for the counter 106, the NAND gate 130, and the AND gate 134. Thus the possibility of causing a malfunction or misoperation due to overflow of the counters 106, 108, 110 and 112 circuit is completely removed at the small cost of reducing the counting capacity of those counters by a few bits.

Figure 5:
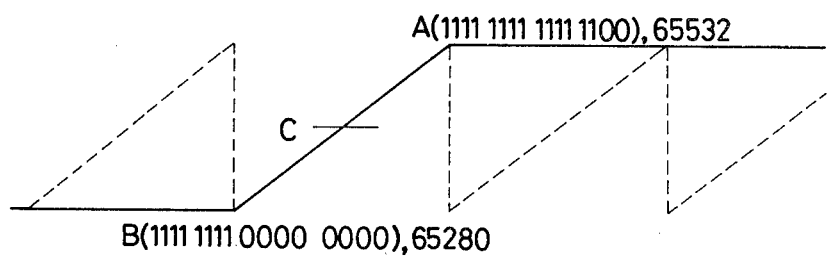
FIG. 5 is a graph for explaining the operation of the servo circuit of FIG. 4.

FIG. 5 is a graph showing the operation of the speed control circuit 100. A level A represents the count state "1111 1111 1111 1100", that is 65532 in decimal. At the level A, the NAND gate 130 supplies the inhibit signal to the AND gate 134, which cuts off the clock pulses to the counters 106, 108, 110 and 112. On the other hand, a level B represents the count state "1111 1111 0000 0000", that is 65280 in decimal. At the level B, the output of the D-type flip-flop 132 goes to 1 and releases the clear condition of the latch circuits 136 and 138. The interval between A and B shows the range of the window where the least significant 8-bit binary outputs of counters 106, 108, 110, and 112 determine the output of the D/A converter 140.

The central level C of the window between the level A and the level B reads "1111 1111 1000 0000", that is, the decimal number 65408. The central preset value of the counters 106, 108, 110 and 112 is "1001 1111 0000 0000" or the decimal number 40704 as described above. The count $X_o$ to the centre of the window from the central preset value will be calculated in accordance with the following equation:

$$65408 = \text{Central preset value} + X_o.$$

Thus $X_o = 24704$. The count 24704 corresponds to a pulse duration corresponding to a frequency of 579.59 Hz on the basis of the clock pulse signal, of 14.31818 MHz, which is used in this embodiment. In other words, 0.0017253 sec, which corresponds to 579.59 Hz is needed to count the 24704 pulses of the clock pulse having a frequency 14.31818 MHz. As the counters 106, 108, 110 and 112 are preset immediately after latching by the leading edge of the ½ FG signal the central frequency of the FG signal is set to 579.59×2 Hz. Provided that the number of detecting teeth of the FG is one hundred and five, the rotational frequency of the capstan shaft is controlled to 11.040 rps. When the rotational speed of the capstan motor decreases, or increases the duration of latching is extended to increase or decrease, respectively the count of the counters 106, 108, 110 and 112. As a result, the output of the D/A converter 140 increases to accelerate, or decreases to decelerate the capstan motor, respectively. Thus, the speed feedback loop operates to keep the rotational speed constant.

Further, it is noted that, although a D/A converter with the relatively rough resolution of 8-bits is used, the overall resolution of the speed control circuit 100 is fine, as indicated in FIG. 5. This is because, while the speed control loop operates in its linear operational range, the least significant bit of the 8-bit signal supplied to the D/A converter represents a resolution of one count out of approximately 24,704 counted by counters 106, 108, 110 and 112. Thus, jitter due to quantising error can be reduced.

However, since the maximum operational range of the speed control loop is approximately ±128/24704 or ±0.5%, of the normal operational speed of the capstan motor the speed control loop can run out of its linear operational range, such as upon start up.

The phase control circuit 102 operates to change the preset data being supplied to the counters 106, 108, 110 and 112 of the speed control circuit 100. The centre of the data (the central preset value) is 1 0000 0000; that is 256, and the data varies from 0 0000 0000 to approximately 1 1111 1111; that is 512. Therefore, the operational centre of the speed control circuit 100 moves by approximately ±256/24704, that is, about 1%, in accordance with the variation of the preset data. Accordingly, when a phase error or preset data shift of more than ±128/24704 occurs transiently, the speed control circuit 100 runs out of the linear control region. But this will not cause the excessive errors which occur in the conventional servo circuits of FIGS. 1 and 2.

As described above, the operational range for acceleration or deceleration is extended up to approximately ±1%, since the position of the window moves by approximately ±1%. The operational range may be wider than that of the speed control loop without running out of the lock-in range.

Referring to FIG. 4, a 9-bit phase detecting counter circuit is formed by cascading preset-type 4-bit counters 142 and 144, and a D-type flip-flop 146. The 9-bit counter circuit receives a clock signal at the clock input terminals CK of counter 142. The clock signal is formed by dividing the frequency of the clock pulse of 14.31818 MHz from the oscillator 104 by forty in a frequency divider 148.

A reference field signal V separated from the video signal or generated by a synchronous signal generator is supplied to a delay circuit 152 through a terminal 150. The delay circuit 152 delays the field signal V by ½ the field time, and supplies its output to the clock input of a D-type flip-flop 156, to which a reference frame signal F is supplied via a terminal 154 at a suitable time during the first field of each frame for synchronization with the output of the delay circuit 152. As a result, a reference control pulse (reference CTL pulse) of ½ duty ratio is produced at the output terminal Q of the flip-flop 156.

In the recording mode, the reference CTL pulse operates a CTL pulse generator 160 to pass a recording current through a CTL head 162 in response to a recording command signal (REC command signal) supplied through a terminal 158. The REC command signal from the terminal 158 is supplied to an 9-bit latch circuit formed by 4-bit latch circuits 163 and 164, and a D-type flip-flop 166. The REC command signal keeps the outputs of the latch circuits 163 and 164 at "0" and the output of the flip-flop 166 at "1". As a result, the preset data to be supplied to the speed control circuit through the lines 126 is "1 0000 0000", so as to fix the data at the centre of the window during the recording mode.

In the reproducing mode, the CTL signal reproduced by the CTL head 162 is amplified by a CTL signal reproducing amplifier 168, the output of which is discriminated in a monostable multivibrator 170. The output of the multivibrator 170, the reproduced CTL pulse, represents the instantaneous position of the tape being read. This reproduced CTL pulse is supplied as a phase signal to the clock input terminals of the 9-bit latch circuit including the circuits 163 and 164, and the flip-flop 166.

The reference CTL pulse from the flip-flop 156 is supplied to the load input terminals LO of the counters 142 and 144 and the reset input terminal of the flip-flop 146. Accordingly, all the contents of the 9-bit counter circuit are kept at "0" during that ½ of the duty cycle that the output of the flip-flop 156 is high. The counter circuit starts counting from the falling edge of the reference CTL pulse. The counting circuit is provided with an AND gate 172, the output of which becomes "1" when the outputs of the 5 most significant bits of the 9-bit outputs of the counter circuit become "1". The output of the AND gate 172 is supplied to the enable terminal (ENA) of the counter 142 so as to inhibit the count enable condition of the counter 142. Thus, the 9-bit counter circuit is prevented from overflowing.

The reproduced CTL pulse from the multivibrator 170 triggers the 9-bit latch circuit to latch the outputs of the 9-bit counter centre circuit. Thus, the count of the 9-bit counter is supplied through the latch circuit to the lines 126 as a preset data.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

I claim:

1. A digital servo circuit for controlling the velocity and phase of a moving member which is driven by an electric motor, said servo circuit comprising:
    means for generating a reference clock signal;
    means for generating a first pulse signal having a repetition rate that varies in accordance with the velocity of said moving member;
    n-bit presettable counter means for counting said reference clock signal during an interval corresponding to said repetition rate of said pulse signal;
    latch means for latching an output of the m least significant bits of said counter means, where m is less than n;
    control means for controlling said m-bit output from said latch means so as substantially to hold the latter output at a minimum level when the n-bit count of said counter means is less than a first predetermined value and at a maximum level when said n-bit count of said counter means is more than a second predetermined value; and
    means for converting said m-bit output from said latch means to a corresponding analog signal with which to control the rotation of said motor.

2. A servo circuit according to claim 1, in which said control means comprises a first detecting circuit for detecting an output of the i most significant bits of said counter means, where i equals n minus m, said first detecting circuit generating a first control signal when said i bits are all in the same condition, and a second detecting circuit for detecting an output of at least the l most significant bits of said counter means, where l is greater than i, said second detecting circuit generating a second control signal when said l bits are all in the same condition.

3. A servo circuit according to claim 2, in which l is less than n.

4. A servo circuit according to claim 2, in which said control means further comprises a first means controlled by said first control signal for preventing the supply of said m-bit output to said converting means in the absence of the generation of said first control signal and a second means controlled by said second control signal for stopping the supply of said reference clock signal to said counter means when said second control signal is supplied thereto.

5. A servo circuit according to claim 4, in which said first means comprise means operative for clearing said latch means, and the clearing function of which is rendered inoperative by said first control signal.

6. A servo circuit according to claim 1, further comprising:
    means providing a reference phase signal;
    means for generating a second pulse signal that represents the instantaneous position of said moving member;
    k-bit counter means for counting said reference clock signal during an interval which corresponds to the phase difference between said second pulse signal and said reference phase signal; and
    means for loading the k bit output of said second counter means into the least significant k bit positions of said first counter means at an interval corresponding to the repetition rate of said first pulse signal.

7. A servo circuit according to claim 6, in which k is less than n and k is greater than m.

* * * * *